(No Model.)
H. STILES.
JUG.
No. 578,370. Patented Mar. 9, 1897.
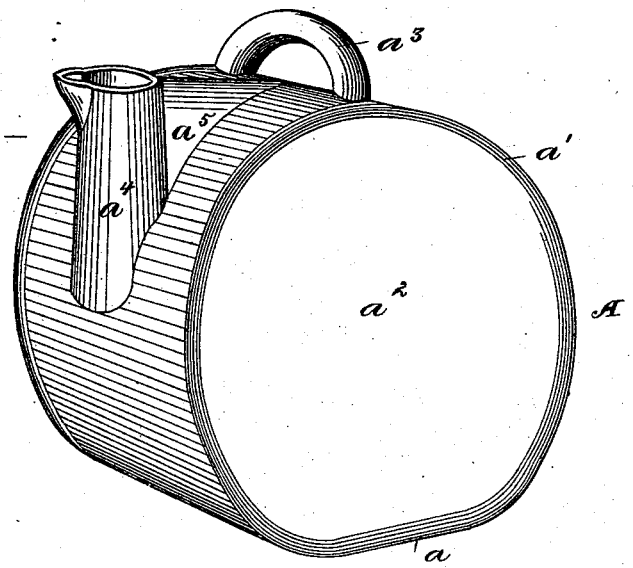
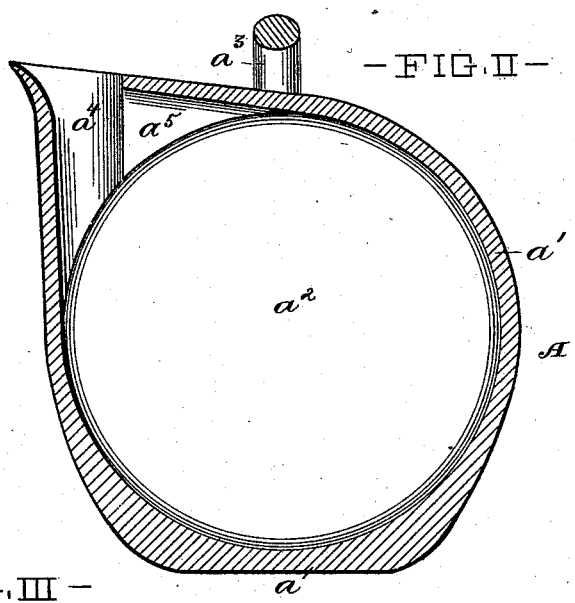
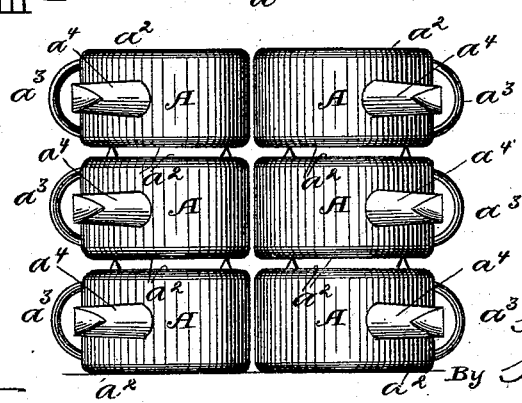
WITNESSES, INVENTOR,

United States Patent Office.

HENRY STILES, OF CLEVELAND, OHIO.

JUG.

SPECIFICATION forming part of Letters Patent No. 578,370, dated March 9, 1897.

Application filed November 14, 1894. Serial No. 528,759. (No model.)

*To all whom it may concern:*

Be it known that I, HENRY STILES, a citizen of the United States, and a resident of Cleveland, county of Cuyahoga, and State of Ohio, have invented certain new and useful Improvements in Jugs, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a perspective view of my improved jug; Fig. II, a transverse section of the same, and Fig. III a view of a number of jugs arranged to illustrate the manner in which they are stacked in the drying-room or kiln.

The body A of the jug is formed substantially cylindrical, with a flat bottom side $a$ and with preferably a slight widening of the cylindrical outlines of the arched surface $a'$ toward the flat bottom, so that the exterior cross-section of the body will be horseshoe-shaped. The ends $a^2$ of the jug are flat and parallel, being in planes at right angles to the flat bottom. A handle $a^3$ is preferably provided at the uppermost point of the arched top of the jug. A spout $a^4$ projects upward tangential to one side of the arched surface of the jug and communicates with the interior of the jug. A vent-channel $a^5$ communicates with the outer end of the spout and with the top of the interior of the jug, extending tangentially from the end of the spout to the highest point of the arched surface of the jug. The vent-channel may communicate for its entire length with the interior of the jug and spout—a form which is preferable in the manufacture of the jug from earthenware or glass.

The jug will on account of its shape be convenient for pouring, as it may be simply rolled over upon the rounded side beneath the spout until the contents flow out through the same. This will insure a steady and easily-controlled pouring out of the contents without splashing out of the contents. As the rounded edge of the bottom upon which the jug thus is tilted is longitudinally straight, the jug cannot wabble, such as an ordinary jug formed upon circular lines around the vertical axis is liable to do when tilted upon the circular edge of its bottom. The flat bottom and widened lower portion will place the center of gravity of the jug near the bottom, so that the jug will not be upset if slightly tilted, but will right itself upon its flat side. The principal advantage, however, of this jug is the convenience wherewith a number of jugs may be stacked for packing or transportation or, if made from earthenware, for drying and baking during their manufacture.

The jugs may be placed upon their flat ends and may be piled, one layer upon another, with the flat ends facing.

In the manufacture of ordinary jugs from earthenware a crock has been required for each jug to enable the jugs to be properly stacked in the drying-house or baking-kiln, as one jug could not be placed on top of another, spaced apart by suitable pins. It is always necessary to place an inverted crock over the neck of each jug to admit of one layer of jugs being stacked over another. In this manner a quantity of crocks are manufactured for which a market has to be created apart from the sale of the jugs.

In my form of jug the layers of jugs may be stacked one above the other, the flat ends of one layer of jugs providing a level support for the next layer without the interposition of a number of crocks.

Other modes of applying the principle of my invention may be employed for the mode herein explained. Change may therefore be made as regards the mechanism thus disclosed, provided the principles of construction set forth, respectively, in the following claim are employed.

I therefore particularly point out and distinctly claim as my invention—

A jug or a similar vessel having arched and longitudinally straight sides and top, a flat bottom, flat ends and a projecting spout at one side, substantially as set forth.

In testimony that I claim the foregoing to be my invention I have hereunto set my hand this 10th day of November, A. D. 1894.

HENRY STILES.

Witnesses:
WM. SECHER,
WILLIAM PATE.